United States Patent

[11] 3,611,133

| [72] | Inventors | Athanase N. Tsergas<br>Wood Dale;<br>Walter J. Kleszczewski, Chicago, both of Ill. |
|---|---|---|
| [21] | Appl. No. | 845,011 |
| [22] | Filed | July 25, 1969 |
| [45] | Patented | Oct. 5, 1971 |
| [73] | Assignee | Ram Tool Corporation<br>Chicago, Ill. |

[54] DUAL VOLTAGE TOOL TESTER
12 Claims, 4 Drawing Figs.

[52] U.S. Cl. .................................................. 324/158 R, 324/51, 324/73 R
[51] Int. Cl. .................................................. G01r 31/02, G01r 31/08
[50] Field of Search ........................................ 324/158, 51, 73

[56] References Cited
UNITED STATES PATENTS

| 2,806,993 | 9/1957 | Matousek ................... | 324/51 |
| 2,840,781 | 6/1958 | Ragonese .................. | 324/51 |
| 2,858,507 | 10/1958 | Liataud et al. ............. | 324/51 X |
| 2,960,654 | 11/1960 | Nelson ....................... | 324/73 |
| 2,994,819 | 8/1961 | Vincent ...................... | 324/51 |
| 3,141,128 | 7/1964 | Behr .......................... | 324/51 |

Primary Examiner—Rudolph V. Rolinec
Assistant Examiner—Ernest F. Karlsen
Attorney—Hill, Sherman, Meroni, Gross & Simpson ABSTRACT: A tool tester for testing tools of multiple voltages and current ratings in which a series of tests are performed on the tool in such a manner that if a fault is located in the tool the succeeding tests will be suspended. The tester may be utilized to test grounded tools or doubly insulated tools and has automatic time delay circuits for allowing the rapid testing of tools.

INVENTORS
Athanase N. Tsergas
Walter J. Kleszczewski

DUAL VOLTAGE TOOL TESTER

CROSS REFERENCE TO RELATED APPLICATIONS

The tool tester of this application comprises an improvement on the tool tester disclosed in application Ser. No. 701,986, now U.S. Pat. No. 3,553,581 entitled "Electric Motor Tester," filed Jan. 31, 1968, invented by Anthanase N. Tsergas and Wallace T. Procik, assigned to the assignee of the present invention.

BACKGROUND OF THE INVENTION

1. Field of the Invention

This invention relates, in general, to testing devices and in particular to devices for testing hand power tools.

2. Description of the Prior Art

Prior testers utilized manual switches and fuses and were designed for particular voltages.

SUMMARY OF THE INVENTION

The present invention provides an automatic tool test which may be utilized for tools with grounded cases or for double insulated tools which eliminates the requirement for fuses and starting switches and which may be set for various operating voltages and for varying currents so as to allow a broad range of tools to be tested. Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

Figure 1:
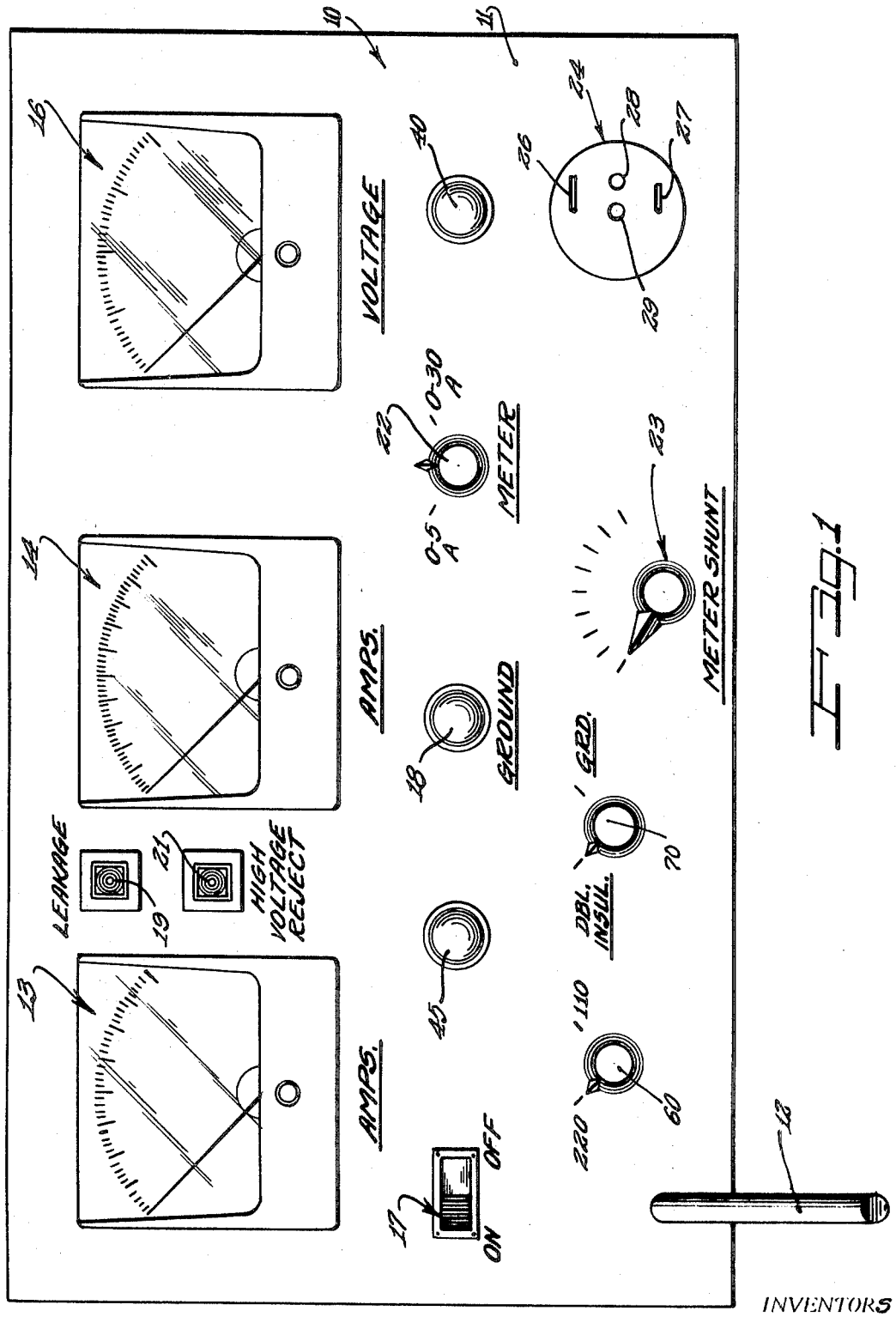
FIG. 1 is a plan view of the control unit of the invention.

A plug in receptacle 24 is formed with a pair of power slots 26 and 27 and a grounding receptacle 28. A switch actuator 29 is also mounted in the plug 24 and is depressed when a plug of the power tool is inserted into the socket 24.

Figure 3:
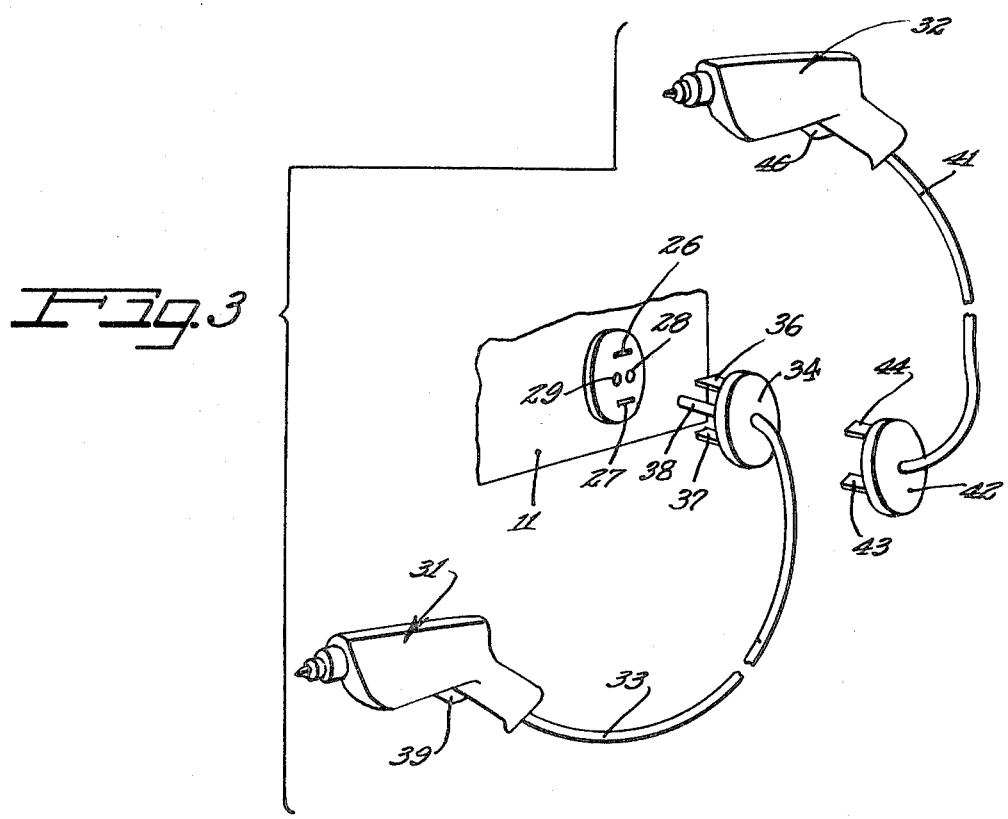
FIG. 3 illustrates different types of tools that may be tested with the invention and the connection plug.

FIG. 3 illustrates a pair of power tools 31 and 32 that may be tested with the testing mechanism of this invention. The power tool 31 might be, for example, a three-wire type which has an extension cord 33 that is connected to a plug 34 formed with power prongs 36 and 37 and which has a grounding prong 38. The tool also has a trigger switch 39 to energize the drill or other power tool being tested. The plug 34 is inserted into the socket 24 with the power prongs 36 and 37 received in the power receptacles 26 and 27 and the grounding pin 38 received in the ground opening 28. The socket 34 is inserted to depress the switch actuator 29 which energizes the tester. The second type of tool that may be tested is the so-called double insulated type which is illustrated in FIG. 3 by a plastic case drill 32 which has an extension cord 41 which connects to a plug 42 that has power prongs 43 and 44. The drill 32 has a trigger switch 46.

Figure 2:
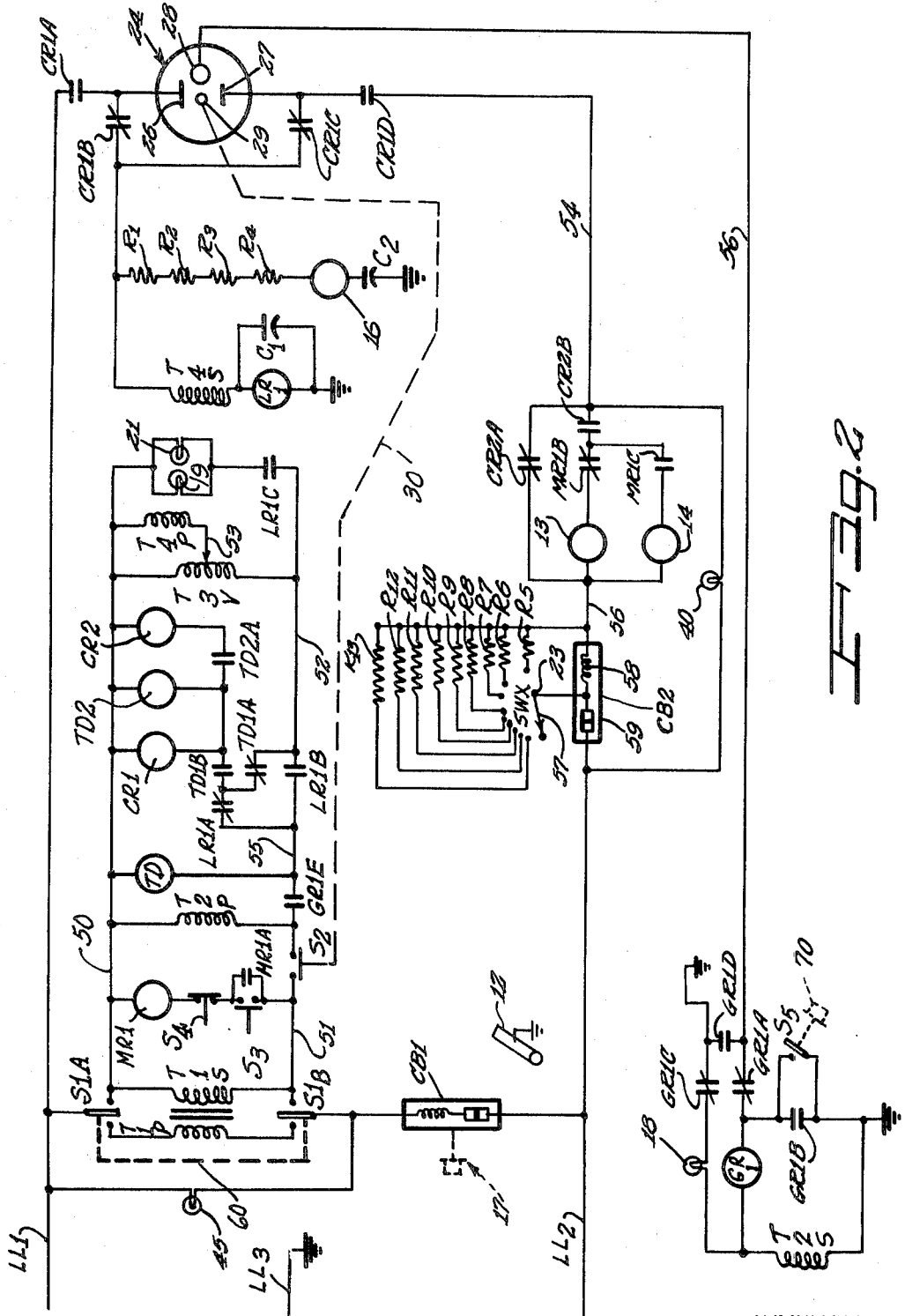
FIG. 2 is a schematic view of the invention.

FIG. 2 is a schematic view of the tester of this invention. The 160 is connected to a suitable three-wire power source which may be either 220 or 110 volts, for example. Line 1 is a first power lead and line 2 is a second power lead and line LL3 is grounded. An on-off light 45 has one side connected to line LL1 and the other side connected to a circuit breaker CB1 which has its other side connected to line LL2. The on-off switch 17 is connected to the circuit breaker CB1 to close its contacts. A switch S1A has a movable contact which is connected to line LL1 and a second movable contact which is connected to the circuit breaker CB1. A switch 60 is connected by suitable mechanical linkage to the switches S1A and S1B to move them to one of two positions. In one position the movable contacts of switches S1A and S1B connect the primary T1P of the transformer between line LL1 and the circuit breaker CB1 and in the other position connects the secondary of the transformer T1S between line LL1 and the circuit breaker CB1. A lead 50 is connected to one side of the secondary T1S and a lead 51 is connected to other side of the transformer secondary T1S. A meter selection circuit is connected between the leads 50 and 51 and comprises a meter relay MR1 which has one side connected to lead 50 and the other side connected to a selector switch $S_4$. A second switch $S_3$ is connected from the switch $S_4$ to the lead 51 and relay contacts MR1A of relay MR1 are connected in parallel with switch $S_3$. A switch $S_2$ is connected in series with line 51. A low-voltage transformer has its primary T2P connected between lead 50 and switch $S_2$. Relay contacts GR1E are connected in series between the switch $S_2$ and relay contacts LR1B. A first time delay TD1 is connected from lead 50 to the junction point between the relay contacts GR1E and LR1B. A current relay CR1 has one side connected to lead 50 and the other side connected to relay contacts of relay TD1B. Relay contacts LR1A are connected to the relay contacts TD1B and have their other sides connected to the junction point between relay contacts GR1E and LR1B. Relay contacts TD1A are connected between the junction point between relay contacts LR2A and TD1B and line 52 which is connected between relay contacts LR1B and relay contacts LR1C. A second time delay circuit TD2 is connected in parallel with the current relay CR1. A relay for connecting the meter into the circuit CR2 has one side connected to line 50 and the other side connected to relay contacts TD2A. A primary T3V is connected between leads 50 and 52 and has a wiper contact 53 which is connected to the transformer T4P which has its other side connected to line 50. The wiper contact 53 may be adjusted to adjust the voltage on the primary of transformer T4P for the high-voltage test.

Neon lights 19 and 21 are connected in parallel with one side connected to the line 50 and the other side connected to contacts of relay LR1C. A relay LR1 has one side connected to the ground and is in parallel with capacitor C1. The other side of the relay LR1 is connected to the secondary T4S of the transformer and through relay contacts CR1B and CR1A to line LL1. Resistors $R_1$, $R_2$, $R_3$ and $R_4$ and voltmeter 16 are connected in series with a capacitor $C_2$ between ground and contacts CR1B.

Plug 24 has its first power contact 26 connected to the junction point between relay contacts CR1A and CR1B and its second power contact 27 connected to the junction points between relay contacts CR1C and CR1D. The other side of relay contact CR1C is connected to one side of the secondary T4S. The switch actuator 29 is connected by mechanical linkage 30 to switch $S_2$ to close it when the plug is inserted into the socket 24. The grounded contact 28 of plug 24 is connected to lead 56 which is connected to relay contacts GR1A and GR1D. The other side of relay contacts GR1D are connected to ground. Relay contacts GR1C are connected to ground and have the other side connected to light 18. The other side of light 18 is connected to the secondary T2S of the transformer. The other side of the secondary TR2S is connected to ground. Relay contact GR1B is connected between ground and the junction point between relay contact GR1A and ground relay GR1. The other side of relay GR1 is connected to the junction point between light 18 and secondary T2S. A switch $S_5$ is connected in parallel with relay contact GR1B and is controllable by selector knob 70.

Line 54 is connected through relay contact CR1D to power contact 27. Line 54 is connected through light 40 to line LL2. Meters 13 and 14 have one side connected to lead 56. The second side of meter 14 is connected through relay contacts MR1C and CR2B to line 54. The other side of meter 13 is connected through relay contacts MR1B and CR2B to line 54. Relay contact CR2A is connected between lines 54 and 56. Circuit breaker CB2 is connected between line LL2 and lead 56. A wiper contact 57 is connected to the junction point between the energizing coil 58 and the contacts 59 of the circuit breaker CB2 and is controllable by the selector knob 23. Contact 57 is engageable with a plurality of contacts of switch SWX which selectively connect one of a plurality of resistors in parallel with the coil 58 of the circuit breaker CB2. These resistors are indicated as resistors $R_5$ through $R_{13}$.

Figure 4:
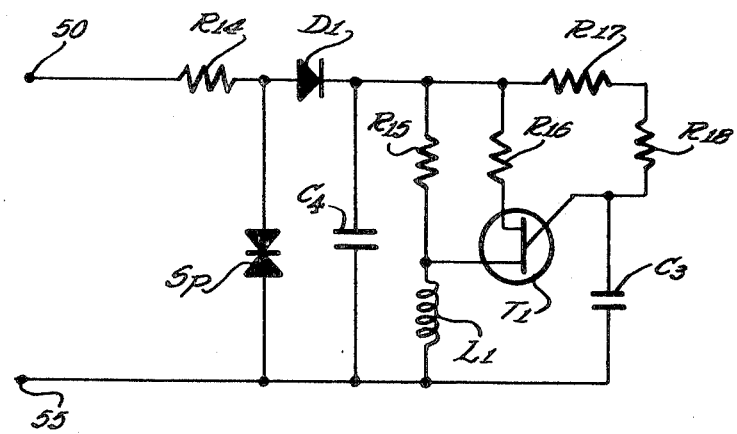
FIG. 4 is a schematic view of the time delay circuit of the invention. The tester of this invention comprises a control unit 10 having a front panel 11 from which a grounding prong 12 extends. A pair of ammeters 13 and 14 are mounted on the unit 10 and a volt meter 16 is also mounted on the front panel of the unit 10. An actuator switch 17 energizes the unit. A ground indicator 18 which might comprise a light bulb is mounted on the front panel 11. A leakage indicator 19 and a high-voltage reject 21 are also mounted on the front panel 11. A meter selection switch 22 is mounted on the front panel and a meter shunt selector switch 23 has a control knob that may be moved to select various impedances.

FIG. 4 illustrates an example of a time-delay relay circuit such as time-delay relays TD1 and TD2. Lead 50 is connected to a resistor $R_{14}$ which is in series with diode $D_1$. A transient suppression diode $S_p$ is connected from the junction between the resistor $R_{14}$ and diode $D_1$ and line 55. For purposes of illustration, time delay TD1 is illustrated although it is to be realized that time-delay relay TD2 may be identical to time delay TD1. A filter capacitor $C_4$ is connected from line 55 to diode $D_1$. The relay coil $L_1$ of the time-delay relay has one side connected to line 55 and the other side to a biasing resistor $R_{15}$ which has its other side connected to diode $D_1$. A unijunction transistor $T_1$ has an electrode connected between resistor $R_{15}$ and $L_1$ and a second electrode is connected to a biasing resistor $R_{16}$ which has its other side connected to diode $D_1$. A resistor $R_{17}$ and second resistor $R_{18}$ are connected in series between diode $D_1$ and a gate electrode of unijunction transistor $T_1$. A time constant capacitor $C_3$ is connected between line 55 and resistor $R_{18}$.

In operation, the time-delay relay operates when voltage is initially applied to lines 50 and 55 in that the unijunction transistor does not pass current and the relay $L_1$ is not energized. The capacitor $C_4$ charges for a particular time delay and fires the unijunction $T_1$ which then allows the relay coil $L_1$ to actuate the relay and move the relay switches associated with it. In particular, the circuit illustrated in FIG. 2, the time delay of relays TD1 and TD2 was chosen as 2 seconds although it is to be realized that different timing may be selected if desired. It is also to be realized that other forms of time-delay relays may be utilized such as those commercially available on the market.

To test a power tool such as the drill 32 or the drill 31, the tester is first set so as to provide the proper setup for the particular tool. For example, with reference to FIGS. 1 and 2, if the tool is a 220 volt tool the lines LL1 and LL2 are connected to 220 volt power and knob 60 is turned to the 220 volt position so that switches S1A and S1B are connected to the primary of T1P. The knob 23 is moved to move the selector contact 57 to place the proper resistance $R_5$ through $R_{13}$ in shunt with the coil 58 of the circuit breaker CB2. The meter selector switch 22 is moved to select the proper ammeter 14 or 16. The switch 70 is moved to open or close switch $S_5$ depending upon whether the tool being tested has a ground lead or whether it is a double-insulated lead. If the tool is a double-insulated lead the switch $S_5$ is closed. The circuit breaker CB1 is closed by moving reset button 17 to assure that the circuit breaker contacts are closed. Then the plug of the particular tool is inserted in the socket 24 which closes switch $S_2$ through the actuator button 29 and its associated linkage 35. The tool will first be tested for ground assuming that that particular tool has a ground lead. The tool is held against the grounded prong 12 of the tester before inserting its plug into the plug 24 of the tester. The switch 39 of the power tool is closed and if the tool is properly grounded a circuit will be completed between ground and the prong 12 of the tester through the metal case of the drill which is in contact with the prong 12 through the grounded lead in the cord 33 to the grounding prong 38 into the socket 28, then through the lead 56 to the normally closed contacts of grounding relay GR1A through the grounding relay GR1, then through the secondary T2S to ground. When current passes through the grounding relay GR1 it is energized to open contacts GR1C and turn light 18 off, to close GR1D and GR1B contacts and to open contacts GR1A. Contacts GR1B, when closed, provide a holding path for relay GR1 and light 18 will remain off if a good ground exists on the tool. Relay GR1 also closes contacts GR1E which applies power between leads 50 and 55 to the time-delay relay TD1 which has a time delay of 2 seconds. During this period the dielectric strength test is applied to the armature and winding of the drill through normally closed contacts CR1B and CR1C which applies high voltage from the secondary T4S to contacts 26 and 27 of the tool. If there is a short or leakage, relay LR1 will be energized which will close contact LR1C to turn on lights 19 or 21 and keep them on. It will open contacts LR1A and close contacts LR1B to apply constant high voltage to the high-voltage transformer T3V and T4P, keeping relay LR1 energized and the lights 19 and 21 on. When this occurs the motor must be rejected and sent back to the production for rework since a short or leakage occurs. The voltmeter 16 shows the applied voltage which might be 10 or more times greater than the operating potential of the tool.

If the tool is good and has no leakage, relay LR1 will not operate and at the end of 2 seconds the time-delay relay TD1 will close, opening contacts TD1A, closing contacts TD1B, applying voltage to current relay CR1 and time-delay relay TD2. Current relay CR1 closes contacts CR1A and CR1D and connects the tool to line power through circuit breaker CB2, closed contacts CR2A, line 54 and through closed contacts CR1D and CR1A. The tool will start to run and after a 2 second time delay, time-delay relay TD2 will be energized closing contacts TD2A to energize current relay CR2 which opens contacts CR2A which are in parallel with the meters 13 and 14 and closes contacts CR2B connecting one of the meters 13 or 14 into the circuit. The time delay from time-delay relay TD2 allows the original surge currents to disappear before the meters 13 or 14 are connected in circuit with the tool.

If, during the time surge current is bypassed by contacts CR2A the current becomes too high, the light 40 will be ignited to indicate an internal short. If the tool is good, the operating current will be read on the proper meter 13 or 14 which has the range for the particular tool. The switch 57 allows the proper impedance to be placed in parallel with the coil 58 of circuit breaker CB2 so that the circuit breaker handles different currents to allow different sized tools to be tested.

For a 110 volt tool which is to be tested, the switches S1A and S1B are moved by lever 60 to engage the winding T1S and the lines LL1 and LL2 are connected to 110 volt source. The test is the same as for the 220 volt test explained above after this change has been made.

For a double-insulated tool which has no ground lead, the switch $S_5$ is closed by moving knob 70 to the double-insulated position and the high voltage and operating tests are conduced in the same manner as before. The present invention eliminates the fuse and starting switch in that the circuit breaker CB1 renders these unnecessary. The variable impedance which may be placed by switch 57 in parallel with the circuit breaker CB2 allows different currents to be handled by the tester without injuring it.

The time delays provide that the meters are not connected until after preliminary tests and surge current has disappeared so that safer operation of the tools occurs and there is less chance of injury to the ammeters 13 or 14. If the tool, for example, has a rating of 5.3 amperes, the switch 57 is adjusted by knob 23 to 6 amperes so that the circuit breaker will open if the no-load current goes above 6 amperes.

It will be understood that modifications and variations may be effected without departing from the spirit and scope of the novel concepts of the present invention.

We claim as our invention:

1. A tester for an electrical device for sequentially applying a ground test, a high-voltage leakage test and an operate test comprising, a plug with a grounding contact and a pair of power contacts into which the power cord of an electrical device may be inserted, a pair of power leads with one of said leads connected in circuit with a first one of said power contacts, a first circuit breaker and a metering circuit connected between said second power contact and the second power lead, a transformer with its primary coupled to said power leads, a grounding relay with one side connected to one side of the secondary of the transformer, the other side of the secondary connected to ground, the other side of the grounding relay connected to said grounding contact, a first indicator connected from the one side of the grounding relay to ground to indicate if an electrical device is not properly grounded, a first time-delay relay energized by said grounding relay, a high-voltage test circuit connected in circuit with said first time-delay relay and connected between ground and the first and second power contacts of said plugs by the first time-delay relay for a predetermined time, a high-voltage leakage and breakdown indicator connected between ground and said pair of power contacts to indicate leakage and breakdown, a high-Voltage relay forming a part of said high-voltage test circuit and energized when a faulty electrical device is tested, a second time-delay relay connected to power by said first time-delay relay after a predetermined time, and means for indicating operating conditions of said electrical device connected in circuit with one of said power leads and controlled by said second time-delay relay.

2. A tester according to claim 1 comprising a second circuit breaker and a power indicator connected between said power leads.

3. A tester according to claim 1 comprising a resistor connected in parallel with said first circuit breaker.

4. A tester according to claim 1 comprising a plurality of resistors with first sides connected to a first side of said first circuit breaker, and a movable contact connected to the second side of said first circuit breaker and engageable with the second sides of said plurality of resistors.

5. A tester according to claim 1 comprising indicating means connected in parallel with the first circuit breaker and the metering circuit.

6. A tester according to claim 2 comprising a second transformer, a first switch with its movable contact connected to the first power lead and selectively engageable with one end of the secondary or the primary of said second transformer, a second switch with its movable contact connected to the second circuit breaker and selectively engageable with the other ends of the secondary or primary of said second transformer, and means connecting the movable contacts of the first and second switches so that they both engage the primary or the secondary of the second transformer.

7. A tester for an electrical device according to claim 1 comprising a grounding switch connected between ground and the other side of said grounding relay to allow the grounding test to be disconnected.

8. A tester according to claim 1 comprising a grounding post connected to ground and engageable with an electrical conductive portion of said electrical device while under test.

9. A tester according to claim 1 comprising means energizable by said second time-delay relay and said means for indicating operating conditions of said electrical device connected in circuit by said relay means.

10. A tester for an electrical device for sequentially applying a ground test, a high-voltage leakage test, a surge current test, and an operate test comprising, a test plug with an actuator, a pair of power receptacles and a grounding receptacle, a pair of power leads, a first circuit breaker connected to the second of said pair of power leads, a first transformer, first switching means for selectively connecting the primary or a first secondary of the first transformer between the first one of said power leads and the circuit breaker, second switching means connected to the actuator of said test plug, a second transformer with its primary and the second switching means connected across the secondary of the first transformer, one side of the secondary of said second transformer connected to ground, a grounding relay connected between the other side of said secondary of the second transformer and said grounding receptacle, a ground indicator connected between ground and the other side of said secondary of the second transformer, a high-voltage transformer and a first time-delay relay connected across the primary of the second transformer by contacts of said grounding relay if a ground exists, the secondary of the high-voltage transformer connected to said pair of power receptacles, a leakage relay connected between ground and the secondary of the high-voltage transformer, a leakage indicator connected across said primary of said high-voltage transformer by contacts of the leakage relay if leakage exists, a surge current relay and a second time-delay relay connected across the first time-delay relay when it is energized, said surge current relay having contacts for connecting operating power to said pair of power receptacles, a second circuit breaker connected between said second power lead and one of said power receptacles, and metering means for measuring operating current connectable in circuit with said power leads by said second time-delay relay.

11. A tester according to claim 10 comprising a shorting switch connected between ground and said grounding relay.

12. A tester according to claim 10 comprising a capacitor connected across said high-voltage relay.